US 8,438,577 B2

(12) United States Patent
Qing et al.

(10) Patent No.: US 8,438,577 B2
(45) Date of Patent: May 7, 2013

(54) METHOD AND SYSTEM FOR EXTENDING SCRIPTING LANGUAGES

(75) Inventors: Richard X. Qing, Ottawa (CA); Bryan R. Goring, Milton (CA); Michael Shenfield, Richmond Hill (CA); Kamen B. Vitanov, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 1743 days.

(21) Appl. No.: 11/107,895

(22) Filed: Apr. 18, 2005

(65) Prior Publication Data

US 2006/0234548 A1 Oct. 19, 2006

(51) Int. Cl.
*G06F 13/00* (2006.01)
*G06F 9/44* (2006.01)
*G06F 9/45* (2006.01)

(52) U.S. Cl.
USPC ............ 719/311; 717/115; 717/116; 717/139

(58) Field of Classification Search .................. 719/311, 719/310, 316, 328; 717/139, 115, 116
See application file for complete search history.

(56) References Cited

U.S. PATENT DOCUMENTS

| | | | | |
|---|---|---|---|---|
| 5,581,684 A | * | 12/1996 | Dudzik et al. ................ | 715/708 |
| 6,256,784 B1 | * | 7/2001 | Grove ........................... | 717/139 |
| 6,405,263 B1 | | 6/2002 | Conner et al. | |
| 6,578,192 B1 | * | 6/2003 | Boehme et al. ............... | 717/115 |
| 6,753,886 B1 | * | 6/2004 | Schuft .......................... | 715/764 |
| 7,016,843 B2 | * | 3/2006 | Fitzpatrick et al. ........ | 704/270.1 |
| 2002/0073396 A1 | | 6/2002 | Crupi et al. | |
| 2002/0129129 A1 | * | 9/2002 | Bloch et al. ................... | 709/220 |
| 2003/0120824 A1 | * | 6/2003 | Shattuck et al. .............. | 709/313 |
| 2003/0149799 A1 | * | 8/2003 | Shattuck et al. .............. | 709/318 |
| 2004/0096186 A1 | * | 5/2004 | Tsumagari et al. ............ | 386/46 |
| 2005/0076344 A1 | * | 4/2005 | Goring et al. ................. | 719/320 |

FOREIGN PATENT DOCUMENTS

WO 01/46802 A2 6/2001

OTHER PUBLICATIONS

"ECMAScript Language Specification 3rd Edition" Online! Dec. 1, 1999, pp. 1-172.
Wikipedia: Prototype-based programming! Online! Apr. 16, 2005, pp. 1-2.
XP007900912—Dynamic programming language, Wikipedia (http://en.wikipedia.org/w/index.php?title=Dynamic_programming_language&oldid=12535021), Dated Jul. 28, 2006, pp. 1-2.
Canadian Intellectual Property Office, Examiner's Report on Canadian Patent Application Serial No. 2,543,910, Dated Apr. 9, 2010, pp. 1-3, Ottawa-Gatineau, Canada.

* cited by examiner

*Primary Examiner* — H S Sough
*Assistant Examiner* — Phuong Hoang

(57) ABSTRACT

A method for extending a script language in a runtime environment of a data processing system to support an application, the runtime environment having a script language interpreter, the method comprising: subclassing a predetermined object defined by the script language to create a subclassed object, the predetermined object having an original method, the subclassed object having a respective replacement method for supporting the application; dynamically registering a symbol corresponding to the subclassed object; detecting the subclassed object in the application with the script language interpreter; and, executing the replacement method with the script language interpreter.

20 Claims, 6 Drawing Sheets

METHOD AND SYSTEM FOR EXTENDING SCRIPTING LANGUAGES

FIELD OF THE INVENTION

This invention relates to the field of wireless communications, and more specifically, to extending scripting languages in wireless and other devices.

BACKGROUND

Current wireless mobile communication devices include microprocessors, memory, soundcards, and run one or more software applications. Examples of software applications used in these wireless devices include micro-browsers, address books, email clients, instant messaging ("IM") clients, and wavetable instruments. Additionally, wireless devices have access to a plurality of services via the Internet. A wireless device may, for example, be used to browse web sites on the Internet, to transmit and receive graphics, and to execute streaming audio and/or video applications. The transfer of Internet content to and from wireless device is typically facilitated by the Wireless Application Protocol ("WAP"), which integrates the Internet and other networks with wireless network platforms.

With respect to the transfer of content to and from the wireless device, in a typical HTTP-based client/server model (e.g., web browser/web server), an ECMA International ("ECMA") compliant scripting language is typically used as a mechanism for providing dynamic content in HTML-based web pages, as such a scripting language is easy to use and easy to extend. In computer programming, a script is a program or sequence of instructions that is interpreted or carried out by another program rather than by the computer processor as a compiled program is. In the context of the Web, script languages are often written to handle forms input or other services for a Web site and are processed on the Web server. A script in a Web page, on the other hand, runs client-side on the Web browser. Thus, with a scripting language, dynamic content and generation logic may be embedded into HTML pages. ECMA host facilities in the Web browser, which are helpful in processing HTTP requests and responses, are built on the top of scripting language engine in the form of scripting objects with an extension method that is implied in ECMA specifications. One such specification is Standard ECMA-262 (or ISO/IEC 16262), entitled "ECMAScript Language Specification", 3$^{rd}$ Edition (December 1999), and which is incorporated herein by reference.

However, certain features of scripting languages, such as "weak-typing" and the dynamic addition of named properties, prevent them from being used in complex applications, since these features make complex scripting-based applications bug-prone and difficult to maintain. In fact, this problem has been regarded as one of major drawbacks of scripting languages and hence ECMA compliant script is often considered as lacking security at a certain level. On the other hand, some data types, which are required by applications or services that the complex applications transact with, are often missing from the scripting model.

For reference, in computer programming, "weak-typing" refers to the strict enforcement of type rules but with well-defined exceptions or an explicit type-violation mechanism. Thus, while weak-typing may be programmer friendly, it catches fewer errors at compile time. C and C++ are usually considered to be languages with weak-typing as they automatically coerce many types (e.g., ints and floats as in the example int a=5; float b=a;). On the other hand, "strong-typing" refers to the strict enforcement of type rules with no exceptions. All types are known at compile time (i.e., they are statically bound). With variables that can store values of more than one type, incorrect type usage can be detected at runtime. Strong typing catches more errors at compile time than weak typing, resulting in fewer runtime exceptions. Java™ and Pascal are usually considered to be languages with strong-typing.

With respect to script languages in particular, they are often referred to as being "untyped" as in some of these languages a user need not declare the type of a variable before using it. The variable's type can be changed based on what has been assigned to it. For example, "var i", where "i" can be assigned a value that is of any type, including primitives and objects, in its lifecycle. Thus, scripting languages in general may be referred to as being "untyped" and languages such as C, C++, and Java™ may be referred to as being "typed" (i.e., weakly-typed and/or strongly-typed). In general, scripting languages are more "untyped" than "typed".

Moreover, simply replacing scripting with advanced languages such as Java™ or C++ in the development of a complex application often results in a longer development cycle and increased maintenance, which is at odds with the goals of a modern rapid application development ("RAD") programming model.

A need therefore exists for an effective method and system for extending scripting languages for use in wireless and other devices. Accordingly, a solution that addresses, at least in part, the above and other shortcomings is desired.

SUMMARY

The present invention provides a method for adding strong data typing and other missing features, required for complex applications, to an ECMA compliant scripting environment.

According to one aspect of the invention, there is provided a method for extending a script language in a runtime environment of a data processing system to support an application, the runtime environment having a script language interpreter, the method comprising: subclassing a predetermined object defined by the script language to create a subclassed object, the predetermined object having an original method, the subclassed object having a respective replacement method for supporting the application; dynamically registering a symbol corresponding to the subclassed object; detecting the subclassed object in the application with the script language interpreter; and, executing the replacement method with the script language interpreter.

In accordance with further aspects of the present invention there is provided an apparatus such as a data processing system or wireless device, a method for adapting this system or device, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

The following detailed description of the embodiments of the present invention does not limit the implementation of the invention to any particular computer programming language. The present invention may be implemented in any computer programming language provided that the operating system ("OS") provides the facilities that may support the requirements of the present invention. A preferred embodiment is implemented in the JAVA™ computer programming language (or other computer programming languages such as C or C++). (JAVA and all JAVA-based trademarks are the trademarks of Sun Microsystems Corporation.) Any limitations presented would be a result of a particular type of operating system or computer programming language and would not be a limitation of the present invention.

Figure 1:
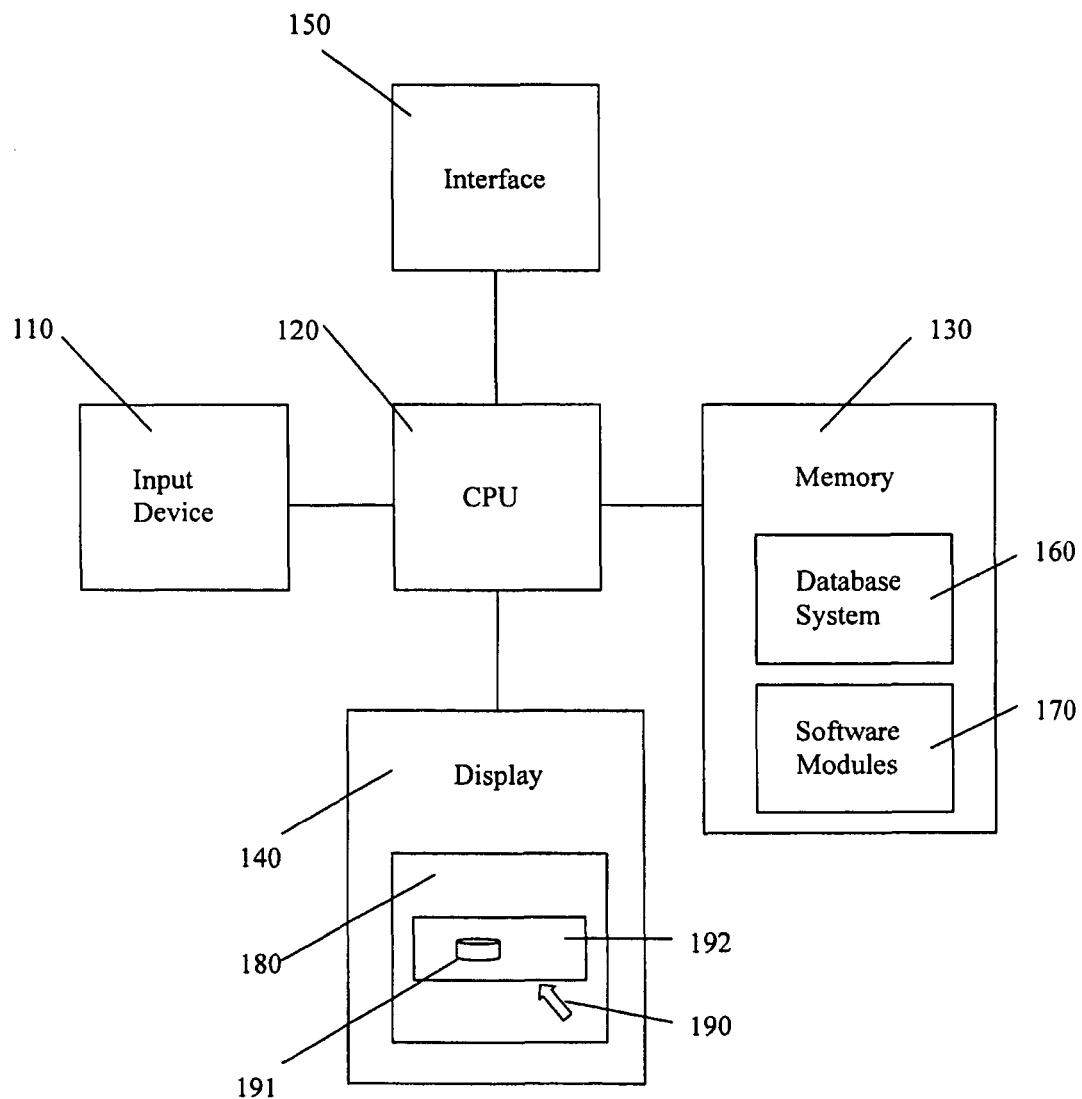
FIG. 1 is a block diagram illustrating a data processing system adapted for implementing an embodiment of the invention.

FIG. 1 is a block diagram illustrating a data processing system 100 adapted for implementing an embodiment of the invention. The data processing system 100 includes an input device 110, a central processing unit or CPU 120, memory 130, a display 140, and an interface 150. The input device 110 may include a keyboard, mouse, trackball, remote control, or similar device. The CPU 120 may include dedicated coprocessors and memory devices. The memory 130 may include RAM, ROM, or disk devices. The display 140 may include a computer screen, terminal device, or a hardcopy producing output device such as a printer or plotter. And, the interface 150 may include a network connection including an Internet connection and a wireless network 220 connection (see FIG. 2). The data processing system 100 is adapted for communicating with wireless devices 210 over a wireless network 220.

The data processing system 100 may be a server system or a personal computer ("PC") system. The CPU 120 of the system 100 is operatively coupled to memory 130 which stores an operating system (not shown), such as IBM Corporation's OS/2™, UNIX, etc., for general management of the system 100. The interface 150 may be used for communicating to external data processing systems (not shown) through a network (such as the Internet) or wireless network 220 (see FIG. 2). Examples of suitable platforms for the system 100 include iSeries™ servers and ThinkCentre™ personal computers available from IBM Corporation. The system 100 may include application server software (not shown), such as WebLogic® Server available from BEA Systems, Inc., for developing and managing distributed applications.

The data processing system 100 may include a database system 160 for storing and accessing programming information. The database system 160 may include a database management system ("DBMS") and a database and is stored in the memory 130 of the data processing system 100.

The data processing system 100 includes computer executable programmed instructions for directing the system 100 to implement the embodiments of the present invention. The programmed instructions may be embodied in one or more software modules 170 resident in the memory 130 of the data processing system 100. Alternatively, the programmed instructions may be embodied on a computer readable medium (such as a CD disk or floppy disk) which may be used for transporting the programmed instructions to the memory 130 of the data processing system 100. Alternatively, the programmed instructions may be embedded in a computer-readable, signal-bearing medium that is uploaded to a network by a vendor or supplier of the programmed instructions, and this signal-bearing medium may be downloaded through the interface 150 to the data processing system 100 from the network by end users or potential buyers.

The CPU 120 of the system 100 is typically coupled to one or more devices 110 for receiving user commands or queries and for displaying the results of these commands or queries to the user on a display 140. As mentioned, the memory 130 may include a variety of storage devices including internal memory and external mass storage typically arranged in a hierarchy of storage as understood to those skilled in the art.

A user may interact with the data processing system 100 and its software modules 170 using a graphical user interface ("GUI") 180. The GUI 180 may be web-based and may be used for monitoring, managing, and accessing the data processing system 100. GUIs are supported by common operating systems and provide a display format which enables a user to choose commands, execute application programs, manage computer files, and perform other functions by selecting pictorial representations known as icons, or items from a menu through use of an input or pointing device such as a mouse 110. In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 140 by using an input or pointing device (e.g., a mouse) 110 to position a pointer or cursor 190 over an object 191 and by "clicking" on the object 191.

Typically, a GUI based system presents application, system status, and other information to the user in "windows" appearing on the display 140. A window 192 is a more or less rectangular area within the display 140 in which a user may view an application or a document. Such a window 192 may be open, closed, displayed full screen, reduced to an icon, increased or reduced in size, or moved to different areas of the display 140. Multiple windows may be displayed simultaneously, such as: windows included within other windows, windows overlapping other windows, or windows tiled within the display area.

Figure 2:
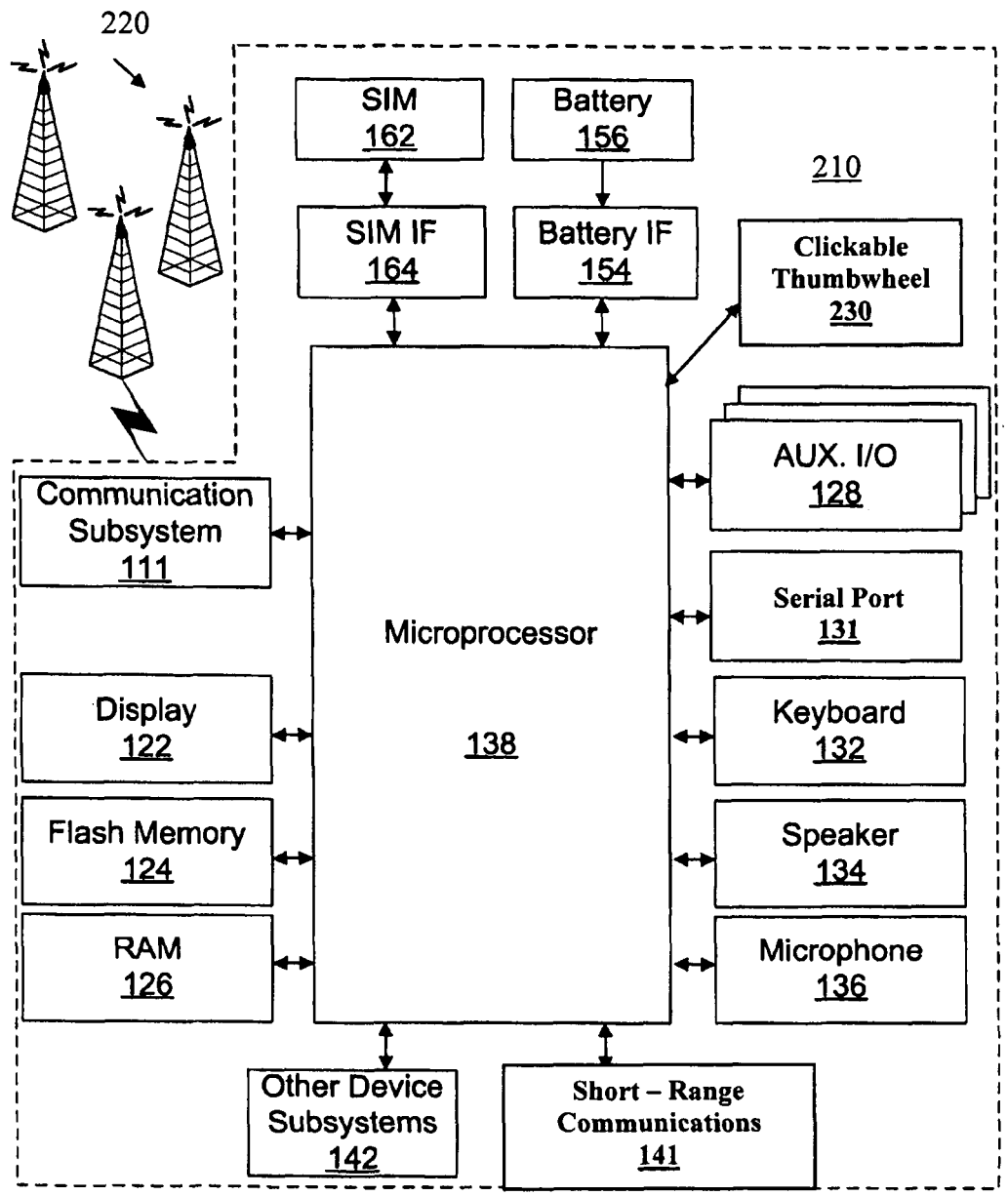
FIG. 2 is a block diagram illustrating a wireless device and a wireless communications system adapted for implementing an embodiment of the invention.

FIG. 2 is a block diagram illustrating a wireless device 210 and a wireless network 220 adapted for implementing an embodiment of the invention. The wireless network 220 includes antenna, base stations, and supporting radio equipment, known to those of ordinary skill in the art, for supporting wireless communications between the wireless device 210 and the data processing system 100. The wireless network 220 may be coupled to a wireless network gateway (not shown) and to a wide area network (not shown) to which the data processing system 100 may be coupled through its interface 150.

The wireless device 210 is a two-way communication device having at least voice and advanced data communication capabilities, including the capability to communicate with other computer systems 100. Depending on the functionality provided by the device 210, it may be referred to as a data messaging device, a two-way pager, a cellular telephone with data messaging capabilities, a wireless Internet appliance, or a data communication device (with or without telephony capabilities). The device 210 may communicate with any one of a plurality of fixed transceiver stations 220 within its geographic coverage area.

The wireless device 210 will normally incorporate a communication subsystem 111, which includes a RF receiver, a RF transmitter, and associated components, such as one or more (preferably embedded or internal) antenna elements, local oscillators ("LOs"), and a processing module such as a digital signal processor ("DSP") (all not shown). As will be apparent to those skilled in the field of communications, the particular design of the communication subsystem 111 depends on the communication network 220 in which the device 210 is intended to operate.

Network access is associated with a subscriber or user of the device 210 and therefore the device 210 typically has a Subscriber Identity Module (or "SIM" card) 162 to be inserted in a SIM interface ("IF") 164 in order to operate on the network (e.g., a GSM network). The device 210 is a battery-powered device so it also includes a battery IF 154 for receiving one or more rechargeable batteries 156. Such a battery 156 provides electrical power to most if not all electrical circuitry in the device 210, and the battery IF 154 provides for a mechanical and electrical connection for it. The battery IF 154 is coupled to a regulator (not shown) which provides power to the circuitry of the device 210.

The wireless device 210 includes a microprocessor 138 which controls overall operation of the device 210. Communication functions, including at least data and voice communications, are performed through the communication subsystem 111. The microprocessor 138 also interacts with additional device subsystems such as a display 122, a flash memory 124 or other persistent store, a random access memory ("RAM") 126, auxiliary input/output ("I/O") subsystems 128, a serial port 131, a keyboard 132, a clickable thumbwheel 230, a speaker 134, a microphone 136, a short-range communications subsystem 141, and any other device subsystems generally designated at 142. Some of the subsystems shown in FIG. 2 perform communication-related functions, whereas other subsystems may provide "resident" or on-device functions. Notably, some subsystems, such as the keyboard 132, display 122, and clickable thumbwheel 230, for example, may be used for both communication-related functions, such as entering a text message for transmission over a communication network, and device-resident functions such as a calculator or task list. Operating system software used by the microprocessor 138 is preferably stored in a persistent store such as the flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

The microprocessor 138, in addition to its operating system functions, preferably enables execution of software applications on the device 210. A predetermined set of applications which control basic device operations, including at least data and voice communication applications, will normally be installed on the device 210 during its manufacture. A preferred application that may be loaded onto the device 210 may be a personal information manager ("PIM") application having the ability to organize and manage data items relating to the user such as, but not limited to, instant messaging ("IM"), email, calendar events, voice mails, appointments, and task items. Naturally, one or more memory stores are available on the device 210 and SIM 162 to facilitate storage of PIM data items and other information.

The PIM application preferably has the ability to send and receive data items via the wireless network 220. In a preferred embodiment, PIM data items are seamlessly integrated, synchronized, and updated via the wireless network, with the wireless device user's corresponding data items stored and/or associated with a host computer system such as the data processing system 100 thereby creating a mirrored host computer on the device 210 with respect to such items. This is especially advantageous where the host computer system is the wireless device user's office computer system. Additional applications may also be loaded onto the device 210 through the network 220, the auxiliary I/O subsystem 128, the serial port 131, the short-range communications subsystem 141, or any other suitable subsystem 142, and installed by a user in RAM 126 or preferably in a non-volatile store (not shown) for execution by the microprocessor 138. Such flexibility in application installation increases the functionality of the device 210 and may provide enhanced on-device functions, communication-related functions, or both. For example, secure communication applications may enable electronic commerce functions and other such financial transactions to be performed using the wireless device 210.

In a data communication mode, a received signal such as a text message, an email message, or web page download will be processed by the communication subsystem 111 and input to the microprocessor 138. The microprocessor 138 will preferably further process the signal for output to the display 122 and/or to the auxiliary I/O device 128. A user of the wireless device 210 may also compose data items, such as email messages, for example, using the keyboard 132 in conjunction with the display 122, the clickable thumbwheel 230, and possibly the auxiliary I/O device 128. The keyboard 132 is preferably a complete alphanumeric keyboard and/or a telephone-type keypad. These composed items may be transmitted over a communication network 220 through the communication subsystem 111 or the short range communication subsystem 141.

For voice communications, the overall operation of the wireless device 210 is substantially similar, except that the received signals would be output to the speaker 134 and signals for transmission would be generated by the microphone 136. Alternative voice or audio I/O subsystems, such as a voice message recording subsystem, may also be implemented on the device 210. Although voice or audio signal output is preferably accomplished primarily through the speaker 134, the display 122 may also be used to provide, for example, an indication of the identity of a calling party, duration of a voice call, or other voice call related information.

The serial port 131 shown in FIG. 2 is normally implemented in a personal digital assistant ("PDA")-type communication device for which synchronization with a user's desktop computer is a desirable, albeit optional, component. The serial port 131 enables a user to set preferences through an external device or software application and extends the capabilities of the device 210 by providing for information or software downloads to the device 210 other than through a wireless communication network 220. The alternate download path may, for example, be used to load an encryption key onto the device 210 through a direct and thus reliable and trusted connection to thereby provide secure device communication.

The short-range communications subsystem 141 shown in FIG. 2 is an additional optional component which provides for communication between the device 210 and different systems or devices, which need not necessarily be similar devices. For example, the subsystem 141 may include an infrared device and associated circuits and components, or a Bluetooth™ communication module to provide for communication with similarly-enabled systems and devices. (Bluetooth™ is a registered trademark of Bluetooth SIG, Inc.)

Figure 3:
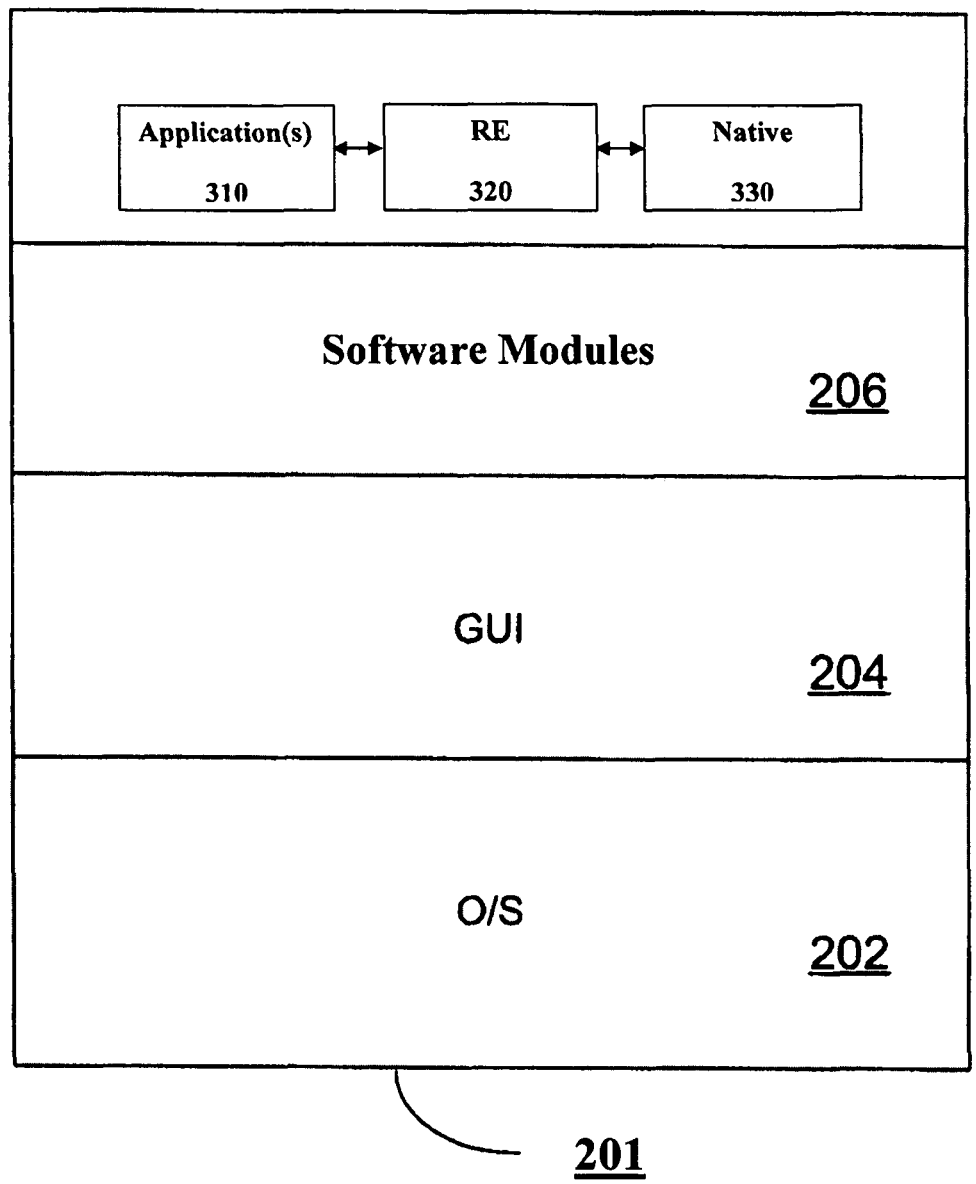
FIG. 3 is a block diagram illustrating a memory of the wireless device of FIG. 2.

FIG. 3 is a block diagram illustrating a memory 201 of the wireless device 210 of FIG. 2. The memory 201 has various software components for controlling the device 210 and may include flash memory 124, RAM 126, or ROM (not shown), for example. In accordance with an embodiment of the invention, the wireless device 210 is intended to be a multi-tasking wireless communications device configured for sending and receiving data items and for making and receiving voice calls. To provide a user-friendly environment to control the operation of the device 210, an operating system ("O/S") 202 resident on the device 210 provides a basic set of operations for supporting various applications typically operable through a graphical user interface ("GUI") 204. For example, the O/S 202 provides basic input/output system features to obtain input from the auxiliary I/O 128, the keyboard 132, the clickable thumbwheel 230, and the like, and for facilitating output to the user. In accordance with an embodiment of the invention, there are provided software modules 206 for extending an EMCA scripting environment as will be described below. Though not shown, one or more applications for managing communications or for providing personal digital assistant like functions may also be included.

Thus, the wireless device 210 includes computer executable programmed instructions for directing the device 210 to implement the embodiments of the present invention. The programmed instructions may be embodied in one or more software modules 206 resident in the memory 201 of the wireless device 210. Alternatively, the programmed instructions may be embodied on a computer readable medium (such as a CD disk or floppy disk) which may be used for transporting the programmed instructions to the memory of the wireless device 210. Alternatively, the programmed instructions may be embedded in a computer-readable, signal-bearing medium that is uploaded to a network by a vendor or supplier of the programmed instructions, and this signal-bearing medium may be downloaded through an interface 111, 131, 141 to the wireless device 210 from the network by end users or potential buyers.

According to one embodiment of the invention, as shown in FIG. 3, the software modules 206 are designed on a layered model, in which one or more wireless applications 310 control the user's experience of the wireless device 210, and a runtime environment ("RE") 320 translates between the application software 310 and a native machine-language 330 of the wireless device 210 to control the hardware of the wireless device, to communicate with data services, etc. The applications 310 may be transmitted or downloaded to the wireless device 210 by the data processing system 100 over the wireless network 220. Typically, the applications 310 contain application logic in the form of XML or Java™ script (i.e., ECMA script) and application data, and the RE 320 includes a script interpreter (not shown).

Now, the present invention provides a system and method for embedding an ECMA-262 compliant scripting engine in a rapid application development ("RAD") programming model. In order to satisfy the programming requirements of this RAD model, i.e. support for strictly-typed data and application level data (variable) scoping that do not come with the scripting environment itself, an object-extension method is applied to add this support while leaving the core of the scripting environment untouched. As will be expanded on in the following, the invention provides the following features: an extended scripting environment for a RAD programming model; new built-in data types for the scripting environment; a strict-typing or strong-typing feature for the scripting environment; and, application level variable scoping.

Figure 4:
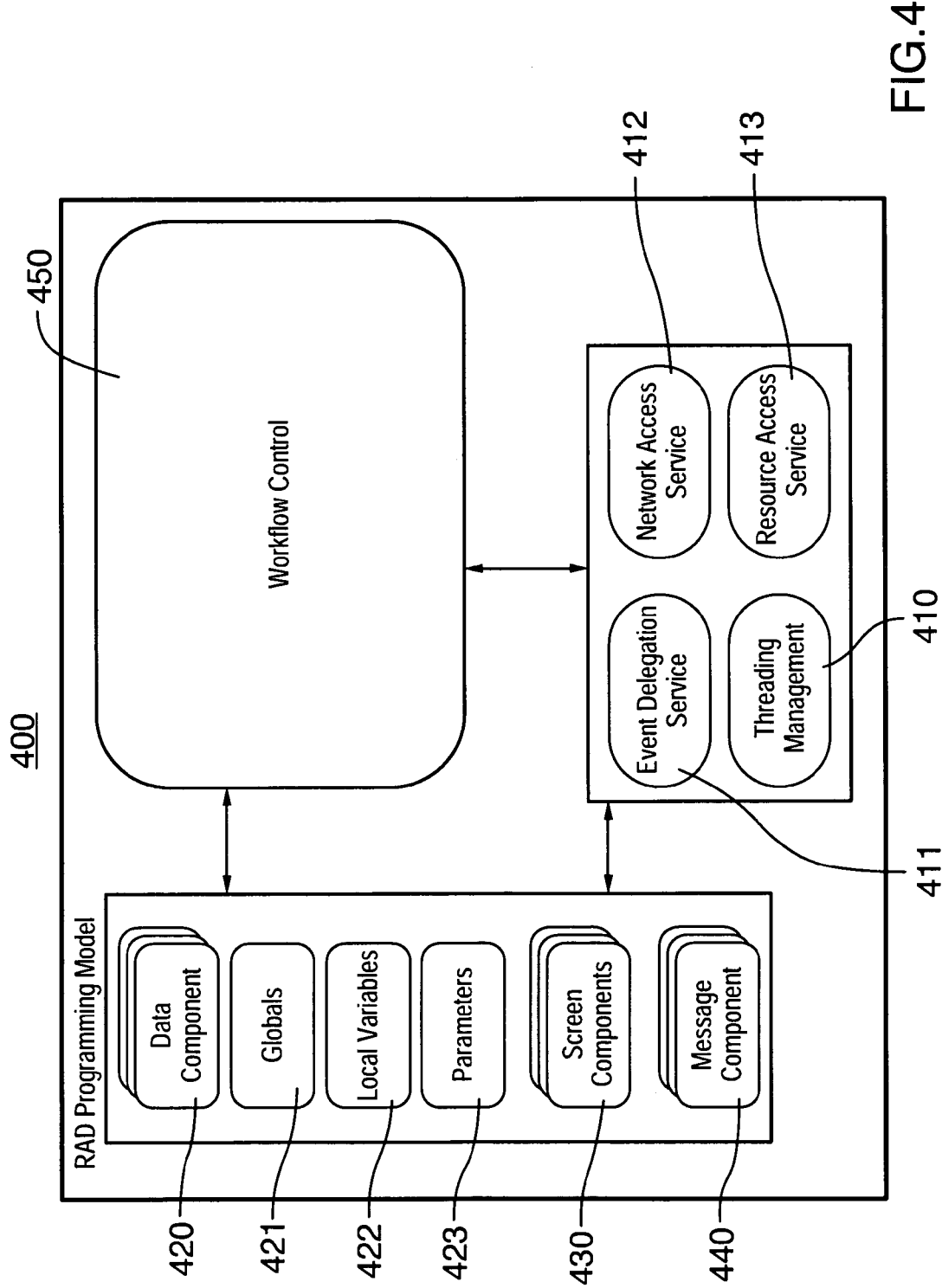
FIG. 4 is a block diagram illustrating a rapid application development (RAD) model having a workflow control module in accordance with an embodiment of the invention.

FIG. 4 is a block diagram illustrating a rapid application development (RAD) model 400 having a workflow control module 450 in accordance with an embodiment of the invention. As shown in FIG. 4, a RAD programming model is a component-based programming model. This model provides built-in threading management 410, event delegation 411, network access 412, and resource access services 413. The functionality of these services is hidden from the application developer, except for the functions that should be provided to the developer, e.g. sending email, playing a sound file, etc. On the top of these management functions and services, all application elements and data are represented and operated as components. As shown in FIG. 4, the model 400 has data components 420, message components 440, and screen components 430, which can be either user-defined or predefined. Application global variables 421, local variables 422, and parameters 423 are other important portions of this model 400. Finally, the workflow control module 450 is used to perform the specific business logic of an application 310.

The following is a brief description of the above components and how this component-based model operates. First, all operable elements, such as data 420, message 440, and screen 430 are represented as components in the model 400. Each component is associated with fields and methods, where fields can be of either a primitive type or a data component type. Moreover, as in other programming models such as Java™ or C++, global variables 421, local variables 422, and parameters 423 between components and functions are inevitable elements of this model 400, with the exception that local variables 422 and parameters 423 must be of a data component type, while global variables 422 can be of any type.

The workflow control module 450 is a key element of the model 400. The components 420, 430, 440 maintain the current status of data, message, and screen for the application 310 at runtime, the service modules 410, 411, 412, 413 provide the necessary basic mechanisms and functions for the runtime 320, and the workflow control module 450 provides for the execution of the application 310 itself.

In particular, the workflow control module 450 provides the following: semantic and syntax of flow control statements; data (variable) access statements; a simple error handling mechanism; expressions and literals; application level data (variable) scoping; a strong-typing mechanism for components and global variables; and, a complete set of primitive data types. Advantageously, the workflow control module 450 does not expose: complex threading management to the developer; low level platform dependent resource access services; or, low level event handling.

According to one embodiment, an extended ECMA scripting environment is used for the workflow control module 450. With the extensions described in the following, such a workflow control module 450 meets the objectives of the RAD programming model 400.

Figure 5:
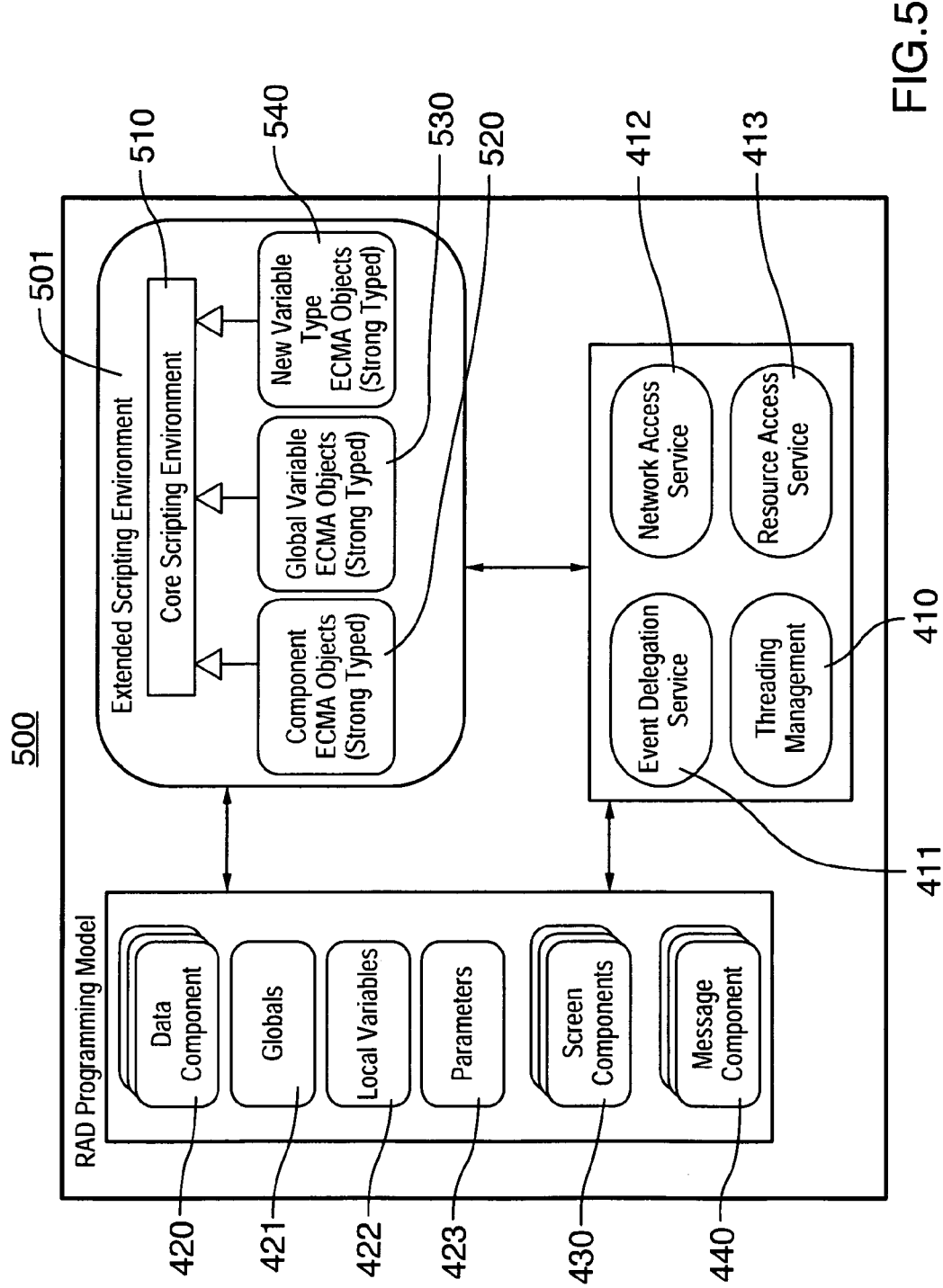
FIG. 5 is a block diagram illustrating a RAD programming model wherein the workflow control module is an extended ECMA scripting environment in accordance with an embodiment of the invention; and, FIG. 6 is a flow chart illustrating operations of modules within the memory of a wireless device for extending an ECMA scripting environment in accordance with an embodiment of the invention.

FIG. 5 is a block diagram illustrating a RAD programming model 500 wherein the workflow control module 450 is an extended ECMA scripting environment 501 in accordance with an embodiment of the invention. In the embodiment of FIG. 5, the extended scripting environment 501 includes a core ECMA scripting environment 510 that is extended to support: strong-typed components 520 and their fields; strong-typed global variables 530 that are accessible to all components; and, new variable types 540 that are missing from the core ECMA scripting environment 510.

An extension method for an ECMA scripting environment 510 is applied to add these new language features. The extension method includes inheriting ECMA object prototypes while adding and/or overriding runtime behaviour for the objects, as shown in FIG. 5. For example, in order to enable access to the data component 420, screen component 430, and message component 440 from a script, component ECMA objects 520 for each of these components 420, 430, 440 are created.

In general, the extension mechanism in the ECMA scripting environment is used to add new language features. That is, new ECMA objects are introduced that subclass the existing ECMA Object (i.e., in ECMA script, every object is a subclass of ECMA Object) in which the methods (e.g., getProperty( ), setProperty( ), etc.) are overridden in order to add the new language features. With respect to terminology, note that a class can only be subclassed or inherited, but not overridden, and only a method or function of a superclass can be overridden by a method of its subclass.

Figure 6:
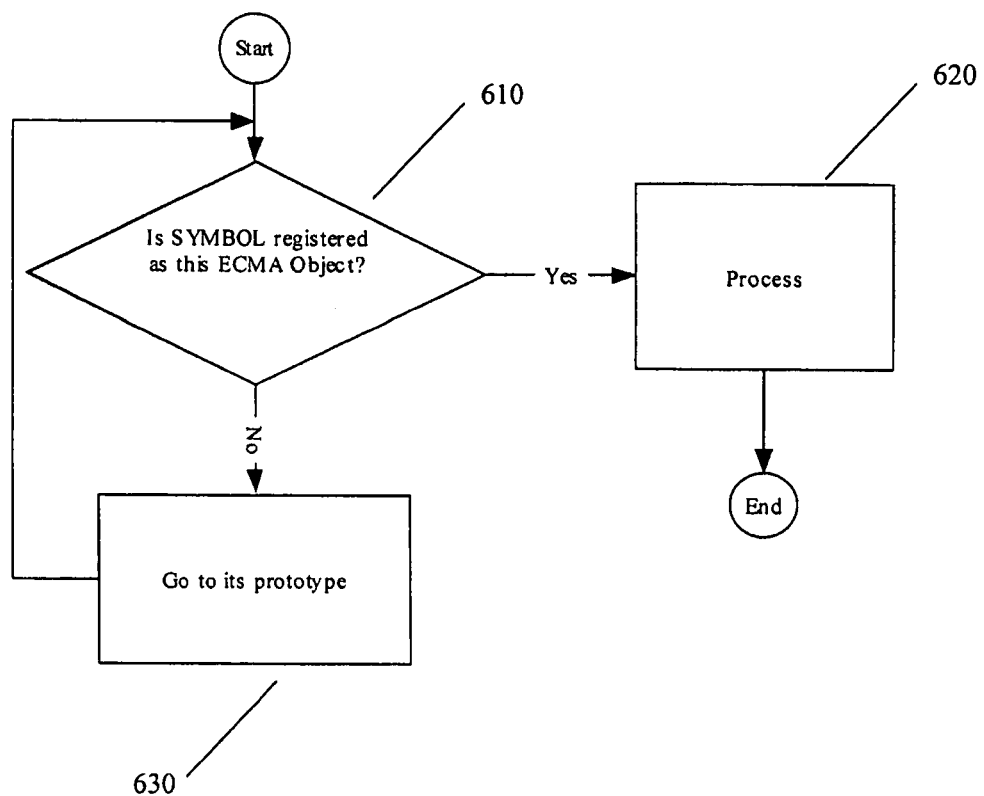

FIG. 6 is a flow chart illustrating operations 600 of modules 206 within the memory 201 of a wireless device 210 for extending an ECMA scripting environment 510 in accordance with an embodiment of the invention. FIG. 6 shows how the extension mechanism for ECMA scripting operates. When the core script interpreter in the runtime environment 320 runs into a symbol, say "Horse", in an application 310 it will query a global registration tree for a corresponding ECMA object 610. If the ECMA object is overridden (i.e., it is a data component in the application), the corresponding ECMA object is picked up and initiated 620. Otherwise, the interpreter goes to an upper level (i.e., its prototype) to look for the ECMA object until a proper object is found 630.

According to one embodiment of the invention, new built-in data types for a scripting environment 510 are provided. The above extension mechanism is used for introducing new built-in data types for the application 310. Consider the following example for an "enumeration" type. In general, an enumeration variable is a variable that can have one of a fixed number of values, each value being designated by name (e.g., hearts, clubs, spades, diamonds). First, two ECMA objects are implemented, which inherit the ECMA object. One is "ECMA_Enum_Literal", which is used to interpret an enumeration literal, and another is "ECMA_Enum", which is used to represent the value of a variable of type enumeration. The following is exemplary script:
  var priority=Priority.HIGH;
Here, "Priority" is a user-defined enumeration type and "HIGH" is one of the values of Priority.

In the runtime 320, the ECMA interpreter encounters the symbol "Priority", it looks this symbol up and finds that it is registered as an ECMA_Enum_Literal object, and then it initiates the object. Next, the ECMA interpreter encounters ".HIGH". According to the syntax of the scripting language, ".HIGH" should be a property of ECMA_Enum_Literal. Accordingly, the interpreter calls getProperty('HIGH') on the ECMA_Enum_Literal object that has just been created. Next, getProperty( ), for example, is overridden and hence an ECMA_Enum object is returned. At the end of the interpretation, the interpreter assigns the object to the local variable "priority".

In the above example, the core scripting interpreter does not know whether the enumeration type exists, but it operates on the enumeration data properly by calling the overridden methods for ECMA objects. This approach can also be used to introduce other new data types, e.g. currency, etc.

According to another embodiment of the invention, strictly-typed data for a scripting environment is provided. To make ECMA scripting less bug-prone and easier to maintain, the concept of strong-typing is employed. In the following example, a "Task" data component is used to describe how the extension method is used to implement strong-typing.

The Task data component is defined as:

```
// pseudo code
Data Task {
    String name;
    Date startTime;
    Date endTime;
    Priority priority;
};
```

In addition, "Priority" is declared as an enumeration type as follows:

```
//pseudo code
Enum Priority {
    HIGH, MEDIUM, LOW
};
```

Now, in a script function:
  var task=Task.create( );
  task.priority=true;
The "putProperty( )" method, for example, is overridden so it checks the type of the right operand, and because "true" is not a valid value of type Priority, it throws a runtime script exception.

More strict-type checking can be provided with the same method. For example, task.priority=Color.RED would cause an exception, as Color.RED is not a valid value of Priority even it is of enumeration type.

Thus, the present invention provides a strong-typing feature by sub-classing an ECMA object and overriding proper methods on it.

According to another embodiment of the invention, application level variable scoping is provided. The core ECMA scripting environment 510 lacks a mechanism for application level variable scoping, that is, a global variable is only accessible from a script function, but not from other structural components of the application 310, such as screen components 430 and message components 440. In general, the scope of a variable is the context within which it is defined. A variable is generally valid within its scope. If a variable is created in a first function, then referenced later in a second function, the second function may return an unexpected result because the variable may be limited in scope to the first function.

In a manner similar to that described above, the extension mechanism is used to provide application level variable scoping. For example, assume "gv_myString" is declared as an application global variable and consider the following exemplary script:
  gv_myString="abcd";
First, gv_myString is accessible by structural components such as screens 430 and messages 440, as a global variable accessing mechanism is implemented outside of the core ECMA scripting environment 510. As a result, the value of gv_myString can be accessed by simple API invocations.

Second, to access gv_myString from script, the symbol "gv_myScript" is registered as a global variable, and hence its processing is redirected to the external global variable accessing mechanism, one part of which is composed of data handlers. One data type is associated with one corresponding data handler. Once the processing of gv_myString is redirected to the external global access mechanism, the proper data handler (i.e., a string data handler in this example) is picked up and used to process gv_myString. That is, a "putvalue( )" method, for example, for the string data handler is called to assign "abcd" to gv_myString. In addition, a type checking can be performed at this point.

According to another embodiment of the invention, suppressing unwanted scripting language features is provided. Unwanted scripting language features can be suppressed by overriding the proper methods of an ECMA object or the methods of the ECMA object's prototype.

For example, assume that the language feature "dynamic addition of named property" is to be suppressed. This feature allows a developer to dynamically add a named property for an ECMA script object. For example, assume "myObject" is an object and consider the following exemplary script:
  myObject.prop1=12;
  myObject.prop2=new Date( );
  myObject.prop3="the 3rd prop.";

The above script will dynamically add and initiate "prop1", "prop2", and "prop3" as new properties of myObject. This feature can cause problems in a complex application. To suppress it, a proper ECMA object can be extended to override the getproperty( ) method, for example, in such a way that it would throw an exception if an undeclared property is referred from the script. Thus, unwanted language features can be suppressed by sub-classing an ECMA object and overriding proper methods on it.

According to the above described embodiments, an ECMA-compliant scripting environment 510 is extended to support non-scripting language features (i.e., rather than just introducing new objects to expose the host facilities) by:
  Introducing new built-in data types and values, such as a built-in user-defined enumeration date type, to simplify the development of a scripting-based application. Without these date types in a scripting environment, a number of script objects and corresponding script functions, including those that can be used as script constructors, would have to be written by individual developers to mimic the behaviour of the data types;
  Introducing new built-in data types and values to make the data model of the application compatible with other applications or services (e.g., web services) that the application exchanges data and/or interacts with; and,
  Introducing strictly-typed language features to the newly introduced data types and objects (e.g., runtime type checking, type conversion etc.) and suppressing bug-prone features of ECMA scripting (e.g., dynamic property addition to an ECMA script object).

These new features are external to the standard ECMA environment 501, that is, these new features do not have to be statically linked to the ECMA environment's libraries, but are dynamically linked and come into effect in the host's runtime environment 320, from which the new language features are provided.

In addition, ECMA scripting is used as a supplement to the application programming model 500, in the sense that:
  The ECMA scripting 501 is employed as the means to provide a majority of the work flow logic 450 for the application 310; and,
  A data (variable) scoping mechanism is provided at the application level, which is used together with the built-in function level scoping of ECMA, to provide an improved and more complete scoping mechanism with which application objects and data can not only be accessed from inside scripts (i.e., at the script function level) but can also be initialized and read from outside scripts (i.e., at the application level). For example, an application global variable can be defined so that it can not only be accessed from script, but also from other structural components of the application 310.

The above described method is generally performed by the wireless device 210. However, according to an alternate embodiment of the invention, the method can be performed by the data processing system 100.

While this invention is primarily discussed as a method, a person of ordinary skill in the art will understand that the apparatus discussed above with reference to a wireless device 210 and a data processing system 100, may be programmed to enable the practice of the method of the invention. Moreover, an article of manufacture for use with a wireless device 210 or data processing system 100, such as a pre-recorded storage device or other similar computer readable medium including program instructions recorded thereon, may direct the wireless device 210 or data processing system 100 to facilitate the practice of the method of the invention. It is understood that such apparatus and articles of manufacture also come within the scope of the invention.

The embodiments of the invention described above are intended to be exemplary only. The scope of the invention is therefore intended to be limited solely by the scope of the appended claims.

What is claimed is:

1. A method for extending a script language in a runtime environment of a data processing system to support an application comprising a component implemented in the script language, the runtime environment having a script language interpreter that is extended to support non-script language features, the method comprising:
  extending with the non-script language a predetermined object having an original method defined by the implementation of the script language interpreter to create an extended object, by defining in the non-script language a handler for handling one or both of built-in application elements and built-in data to thereby process a respective replacement method for supporting the application, the replacement method overriding the original method;
  dynamically registering a symbol corresponding to the handler of the extended object;
  detecting the symbol corresponding to the handler of the extended object in the application with the script language interpreter;
  calling the replacement method of the extended object from the script language interpreter; and,
  executing the replacement method of the extended object.

2. The method of claim 1 wherein the script language is an ECMA-262 compliant script language.

3. The method of claim 2 wherein the replacement method introduces a data type.

4. The method of claim 3 wherein the data type is an enumeration data type.

5. The method of claim 3 wherein the data type is a strong-typed data type.

6. The method of claim 1 wherein the data processing system is a wireless device.

7. The method of claim 1, wherein the handler is also for handling built-in data types.

8. The method of claim 1, wherein the replacement method overrides one or both of a setProperty method and a getProperty method.

9. A system for extending a script language in a runtime environment of the system to support an application comprising a component implemented in the script language, the runtime environment having a script language interpreter that is extended to support non-script language features, the system comprising:
- a processor coupled to memory and an interface to a network, and configured to:
- extend with the non-script language a predetermined object having an original method defined by the implementation of the script language interpreter to create an extended object, by defining in the non-script language a handler for handling one or both of built-in application elements and built-in data to thereby process a respective replacement method for supporting the application, the replacement method overriding the original method;
- dynamically register a symbol corresponding to the handler of the extended object;
- detect the symbol corresponding to the handler of the extended object in the application with the script language interpreter;
- call the replacement method of the extended object from the script language interpreter; and,
- execute the replacement method of the extended object.

10. The system of claim 9 wherein the script language is an ECMA-262 compliant script language.

11. The system of claim 10 wherein the replacement method introduces a data type.

12. The system of claim 11 wherein the data type is an enumeration data type.

13. The system of claim 11 wherein the data type is a strong-typed data type.

14. The system of claim 9 wherein the system is a wireless device.

15. A non-transitory computer readable medium tangibly embodying computer executable codes for directing a data processing system to extend a script language in a runtime environment of the data processing system to support an application comprising a component implemented in the script language, the runtime environment having a script language interpreter that is extended to support non-script language features, the codes comprising:
- code for extending with the non-script language a predetermined object having an original method defined by the implementation of the script language interpreter to create an extended object, by defining in the non-script language a handler for handling one or both of built-in application elements and built-in data to thereby process the predetermined object having a respective replacement method for supporting the application, the replacement method overriding the original method;
- code for dynamically registering a symbol corresponding to the subclassed object;
- code for detecting the symbol corresponding to the handler of the extended object in the application with the script language interpreter;
- code for calling the replacement method of the extended object from the script language interpreter; and,
- code for executing the replacement method of the extended object.

16. The computer readable medium of claim 15 wherein the script language is an ECMA-262 compliant script language.

17. The computer readable medium of claim 16 wherein the replacement method introduces a data type.

18. The computer readable medium of claim 17 wherein the data type is an enumeration data type.

19. The computer readable medium of claim 17 wherein the data type is a strong-typed data type.

20. The computer readable medium of claim 15 wherein the data processing system is a wireless device.

* * * * *